United States Patent [19]
Mogamiya

[11] Patent Number: 5,937,215
[45] Date of Patent: Aug. 10, 1999

[54] CAMERA HAVING A ZOOM LENS

[75] Inventor: Makoto Mogamiya, Tokyo, Japan

[73] Assignee: Asahi Kogaku Kogyo Kabushiki Kaisha, Tokyo, Japan

[21] Appl. No.: 08/980,302

[22] Filed: Nov. 28, 1997

[30] Foreign Application Priority Data

Nov. 29, 1996 [JP] Japan .................................. 8-319486

[51] Int. Cl.⁶ .................................................. G03B 17/00
[52] U.S. Cl. ............................................. 396/85; 396/72
[58] Field of Search .................................. 396/72, 79, 85

[56] References Cited

U.S. PATENT DOCUMENTS

| | | |
|---|---|---|
| 4,799,073 | 1/1989 | Asano et al. .............................. 396/72 |
| 5,130,851 | 7/1992 | Shirie .......................................... 396/72 |
| 5,146,260 | 9/1992 | Yamamoto ................................ 396/79 |
| 5,321,454 | 6/1994 | Mogamiya . |
| 5,592,250 | 1/1997 | Shimizu . |
| 5,640,278 | 6/1997 | Mogamiya . |

*Primary Examiner*—Russell Adams
*Attorney, Agent, or Firm*—Greenblum & Bernstein P.L.C.

[57] ABSTRACT

Disclosed is a camera which includes a lens having a plurality of lens groups, at least one of the plurality of lens groups being moved in a direction of an optical axis to vary a focal length of the lens. The camera further includes a cam cylinder, driven to rotate about a rotational axis of the cam cylinder, for moving the at least one of the plurality of lens groups. The plurality of lens groups and the cam cylinder are not coaxially arranged. The plurality of lens groups are positioned outside the cam cylinder.

16 Claims, 5 Drawing Sheets

CAMERA HAVING A ZOOM LENS

BACKGROUND OF THE INVENTION

1. Field of the invention

The present invention relates to a camera having a zoom lens in which at least one lens group is driven to move by a cam mechanism to vary a focal length of the zoom lens.

2. Description of the Related Art

In a conventional zoom lens of a camera, at least one lens group (movable lens group), in a plurality of lens groups aligned along a common optical axis, is driven to move in the optical axis direction to vary the focal length of the whole optical system. A cam mechanism is often used to move the movable lens group in the optical axis direction. Namely, the movable lens group is driven to move through a cam, generally in the form of a cylinder or plate, which is moved manually or is motor-driven. The cam is provided on its surface with at least one cam edge, and a groove or slot in which a follower fixed to the movable lens group is engaged, so that the movable lens group is moved in response to the movement of the cam. Such a cam Mechanism is effectively utilized in a case where two or more than two movable lens groups are moved relative to each other in a predetermined relationship to effect zooming.

In the case where the cam is in the form of a cylinder, i.e., the cam is provided as a cam cylinder, the cam cylinder is arranged around the movable lens group concentrically to the whole zoom lens optical system so that the movable lens group is moved by a rotational movement of the cam cylinder. On the other hand, in the case where the cam is in the form of a plate, i.e., the cam is provided as a cam plate, the cam plate is arranged aside of the movable lens group to be movable in a direction perpendicular to the optical axis direction of the zoom lens optical system, so that the movable lens group is moved by a linear movement of the cam plate. As a type of cam plate a disk-shaped cam plate is known. In the case of such a disc-shaped cam plate being used, the disc-shaped cam plate is rotated so as to move the movable lens group.

In the case of the aforementioned cam cylinder being used, because the cam cylinder is arranged around the movable lens group, the diameter or height of the zoom lens is unavoidably made large, which is disadvantageous for designing a camera having a short height. In the case of the aforementioned cam plate being used, a large space for the linear movement of the cam plate is necessary to be provided in a camera body, which makes it difficult to design a slim camera. This is also true in the case of the aforementioned disk-shaped cam plate being used.

Instead of using the cam mechanism, the movable lens group can be moved in the optical axis direction using a lead screw to effect zooming. In this case, the lead screw is arranged aside of the movable lens group parallel to the optical axis thereof. A female thread portion formed in a supporting frame of the movable lens group is engaged with the lead screw, so that the movable lens group is moved in the optical axis direction when the lead screw rotates. The lead screw is generally rotated by a motor. It is necessary to provide one lead screw and one motor when one movable lens group needs to be moved to effect zooming. However, when more than one movable lens group needs to be moved to effect zooming, a corresponding number of lead screws and motors need to be provided. Thus, the structure of a lens driving mechanism becomes large and complicated and accordingly it is difficult to design a slim camera.

SUMMARY OF THE INVENTION

The primary object of the present invention is to provide a camera having a zoom lens in which a zoom lens driving mechanism can be designed small and compact to make it possible to realize a slim and compact zoom camera.

To achieve the object mentioned above, according to an aspect of the present invention, there is provided a camera which includes a lens and a cam cylinder. The lens includes a plurality of lens groups. At least one of the plurality of lens groups is moved in a direction of an optical axis to vary a focal length of the lens. The cam cylinder is driven to rotate about a notational axis of the cam cylinder, for moving the lens group(s). Thus, the plurality of lens groups and the cam cylinder are not coaxially arranged. Also, the plurality of lens groups are positioned outside the cam cylinder.

Preferably, the camera further includes a lens holder for holding the plurality of lens groups inside the lens holder. Preferably, the cam cylinder is formed to have a diameter smaller than the height of the lens holder. Preferably, the camera further includes a first motor for rotating the cam cylinder about the rotational axis. At least a part of the first motor is positioned inside the cam cylinder.

Preferably, the camera further includes a second motor or moving at least another one of the lens groups in the direction of the optical axis to bring a subject into focus. The part of the first motor is positioned inside the cam cylinder at one end of the cam cylinder, and wherein at least a part of the second motor is positioned inside the cam cylinder at the other end of the cam cylinder.

According to another aspect of the present invention, there is provided a zoom lens unit which includes a zoom lens optical system, a lens holder and a cam cylinder. The zoom lens optical system comprises of a plurality of lens groups. At least one of the lens groups is moved in an optical axis direction to vary the focal length of the zoom lens optical system. The lens holder is for holding the zoom lens optical system while allowing the lens group(s) to move in the optical axis direction. The cam cylinder is driven to rotate about a rotational axis of the cam cylinder, for moving the lens group(s). The cam cylinder is supported by the lens holder to be positioned outside the lens holder.

According to yet another aspect of the present invention, there is provided a zoom lens mechanism which includes a plurality of lens groups and a cam cylinder. At least one of the lens groups is guided in an optical axis direction. The cam cylinder is driven to rotate about a rotational axis of the cam cylinder, for moving the lens groups(s) in the optical axis direction to effect zooming. The plurality of lens groups are positioned outside the cam cylinder.

The present disclosure relates to subject matter contained in Japanese Patent Application No. 8-319486 (filed on Nov. 29, 1996) which is expressly incorporated herein by reference in its entirety.

BRIEF DESCRIPTION OF THE DRAWINGS

The invention will be described below in detail with reference to the accompanying drawings in which.

DESCRIPTION OF THE PREFERRED EMBODIMENT

Figure 1:
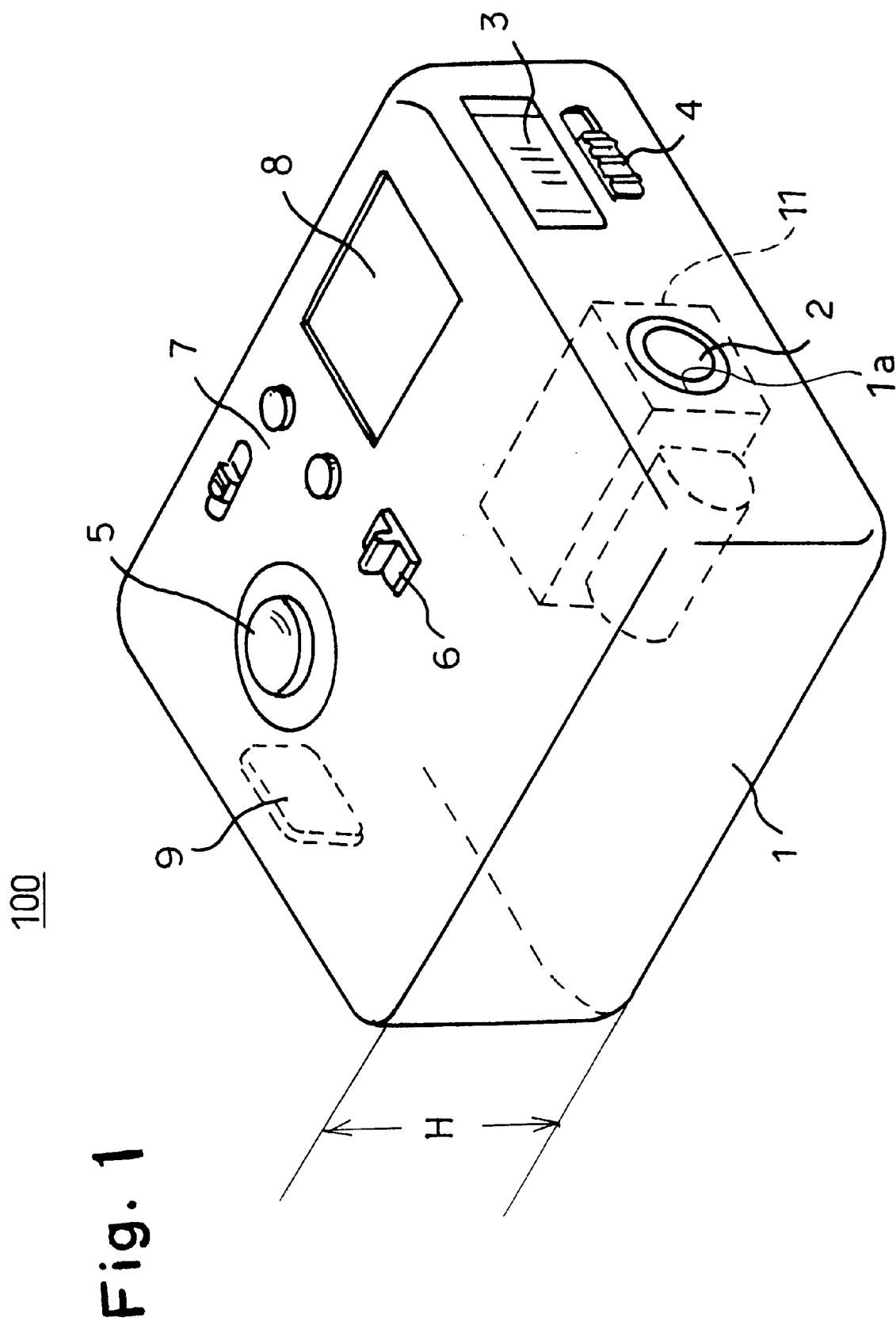
FIG. 1 is a perspective view of a digital still camera to which the present invention is applied.

FIG. 1 shows an embodiment of a digital still camera to which the present invention is applied. This camera 100 is an AF (autofocusing) type of digital still camera having a zoom lens incorporated therein. The camera 100 is provided with a flat and box-shaped camera body 1 having a short height H. At the front of the camera body 1 to one side a flash 3 and a sliding switch 4 for turning the flash 3 ON or OFF are provided. The camera 100 is provided in a front portion of the camera body 1 with a zoom lens optical system (photographic optical system) 2.

On the top side of the camera body 1 is provided a shutter release 5, a zoom operational knob 6, an information display panel 8 and several operational buttons 7. The focal length of the zoom lens optical system 2 varies when the zoom operational knob 6 is manually operated. The information display panel 8 is composed of an LCD panel for indicating various photographic information (e.g., frame number, battery information, flash information, focal length information, etc.). The camera body 1 is provided at its rear with an eyepiece window 9 of a viewfinder of the camera body 1.

Figure 6:
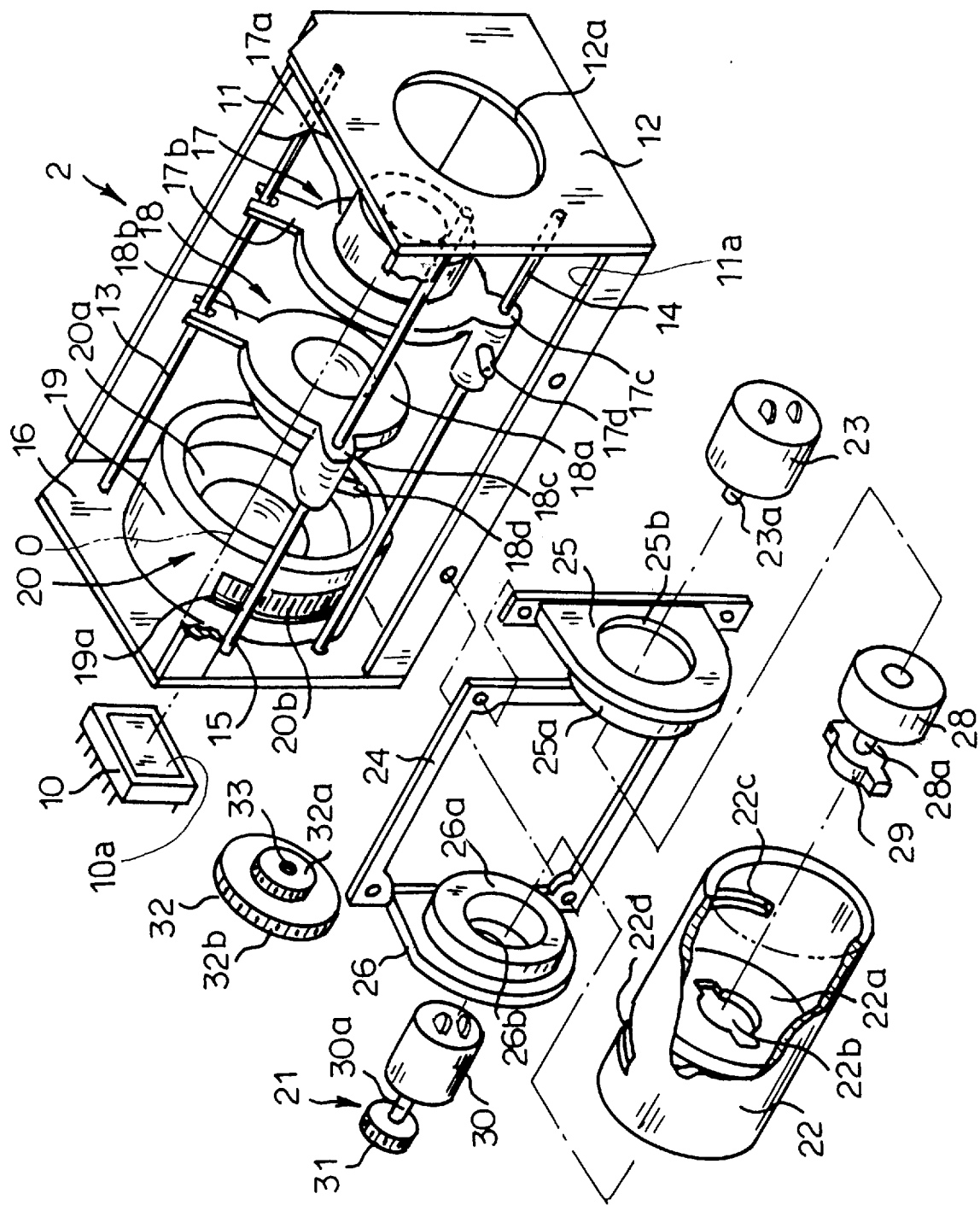
FIG. 6 is a partly-exploded perspective view of the zoom lens optical system and the zoom lens driving mechanism shown in FIG. 2.

The camera 100 is provided in the camera body 1 with a CCD (image pick-up device) 10 (see FIGS. 3 or 6) positioned behind the rear of the zoom lens optical system 2 so that the image of a subject is focused on the CCD 10 through the zoom lens optical system 2. The camera 100 is further provided in the camera body 1 with a processing circuit (not shown) for electrically processing electrical signals of image data obtained from the CCD 10, storing the processed signals and indicating the same as a visual image which can be seen through the eyepiece window 9. Accordingly, in the camera 100, a subject image is captured through the zoom lens optical system 2 and the CCD 10 as a digital image that can be seen through the eyepiece window 9. The digital image can be stored in a predetermined storing medium (e.g., a flash memory, a floppy disc, etc.) when the shutter release 5 is depressed. The storing medium may be provided immovably in the camera body 1 or as a removable medium that can be removably inserted in the camera body 1.

Figure 2:
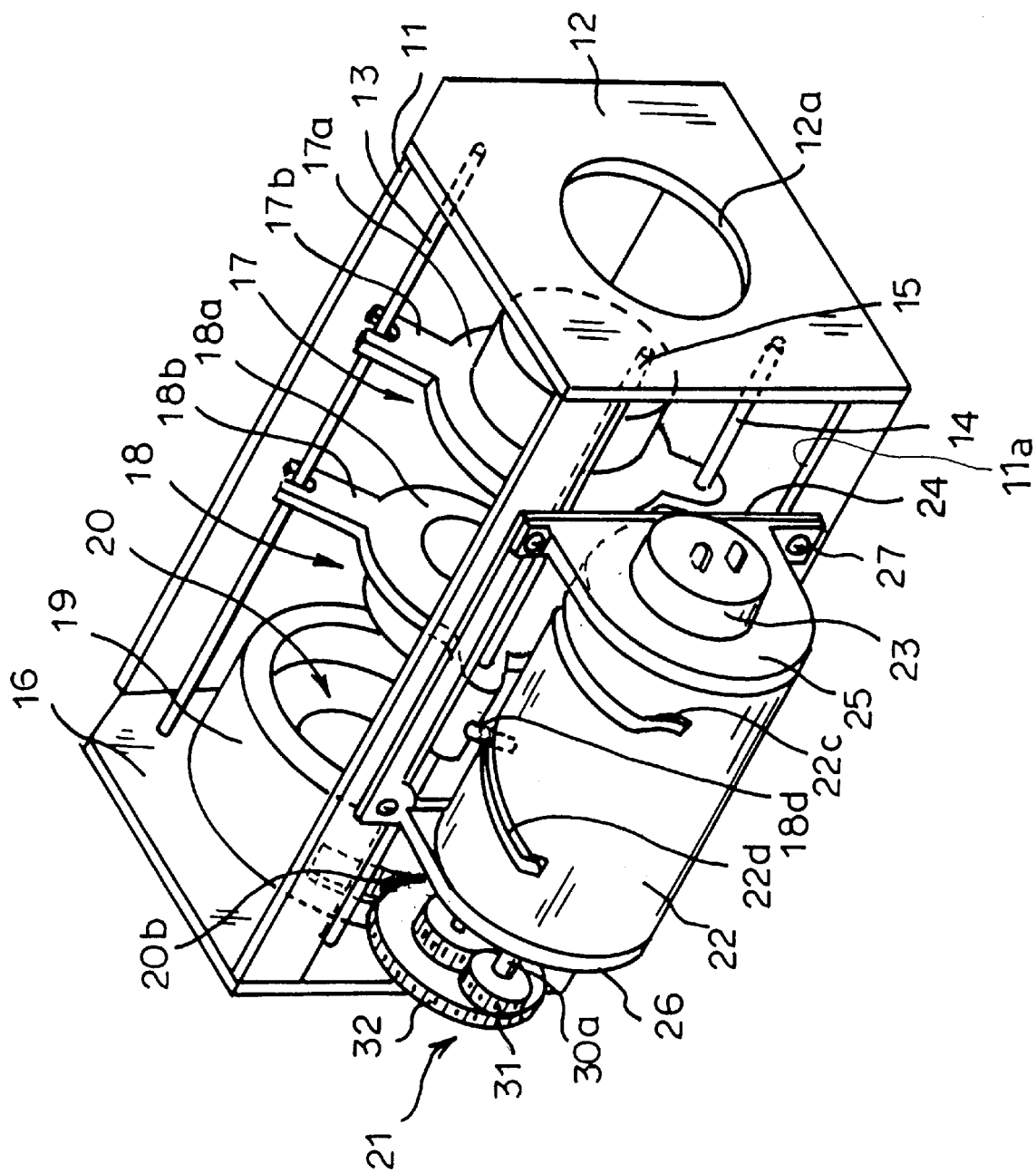
FIG. 2 is a perspective view of a zoom lens optical system and a zoom lens driving mechanism.
Figure 3:
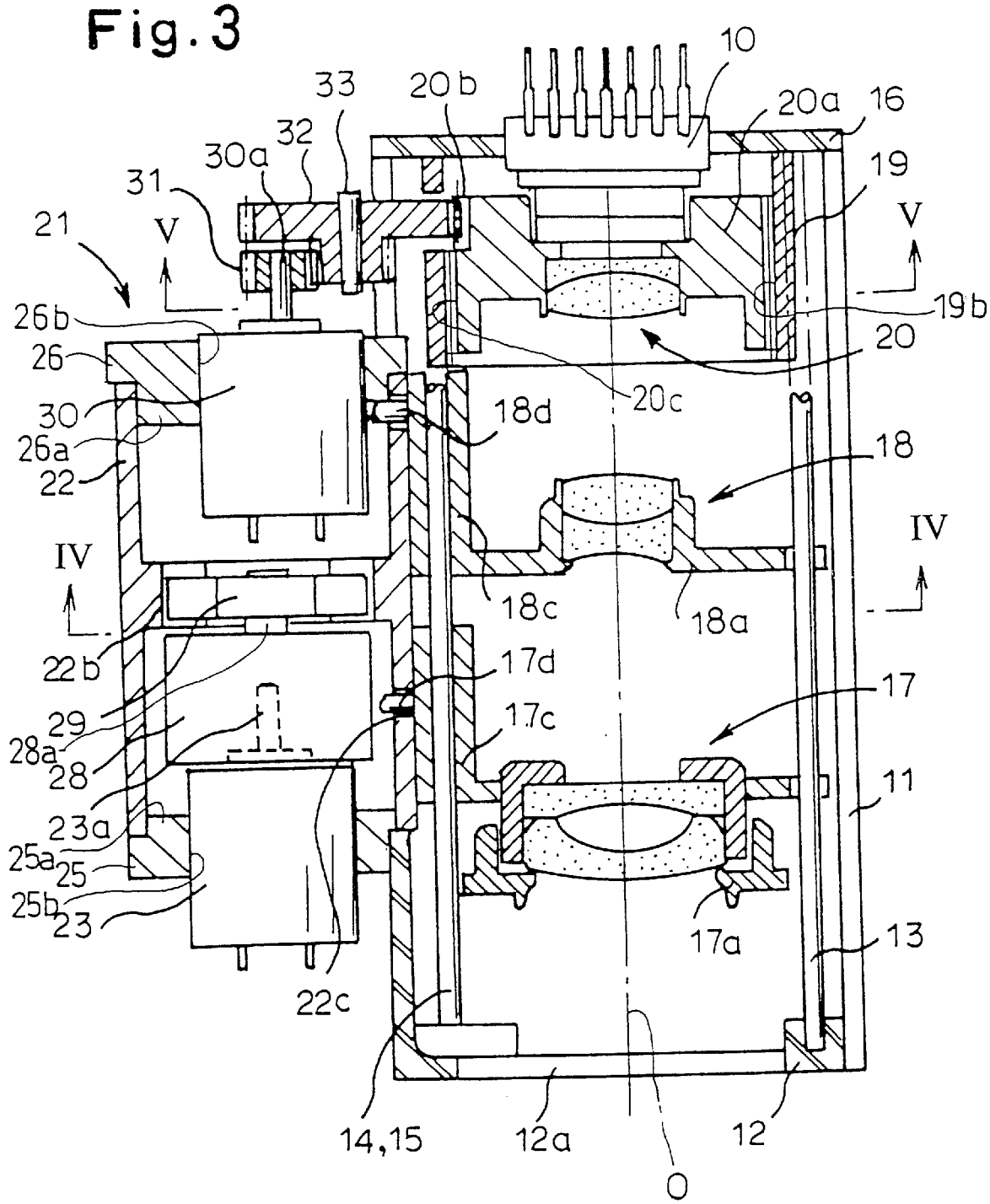
FIG. 3 is a cross sectional view of the zoom lens optical system and the zoom lens driving mechanism shown in FIG. 2.
Figure 4:
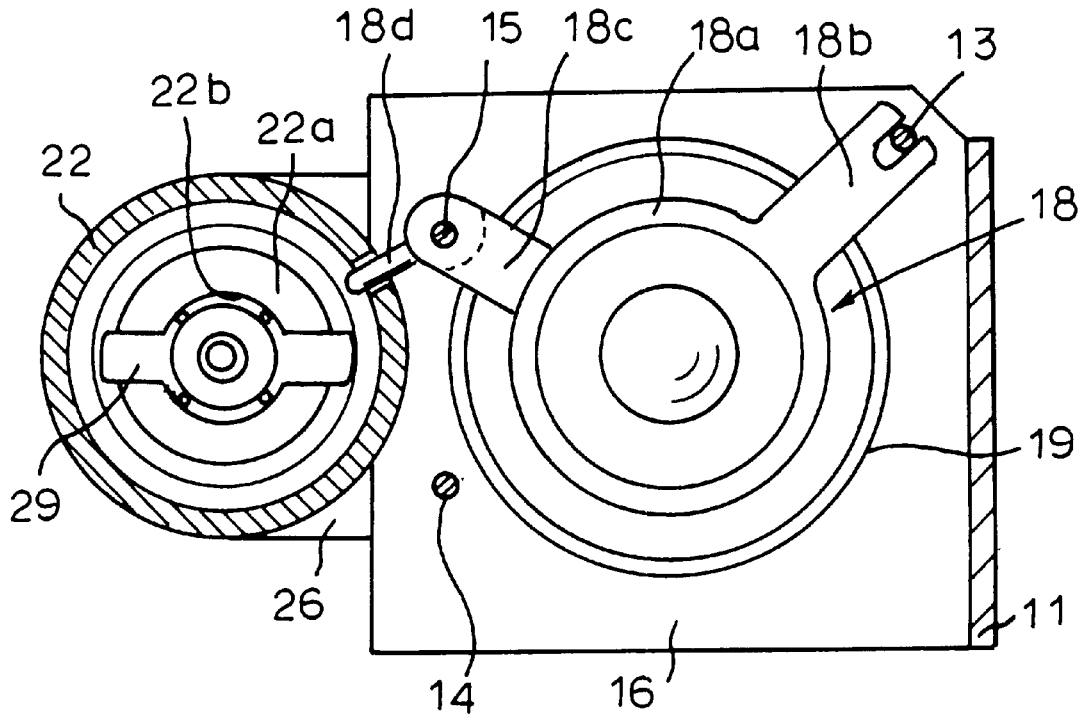
FIG. 4 is a cross sectional view taken along line A—A shown in FIG. 3.
Figure 5:
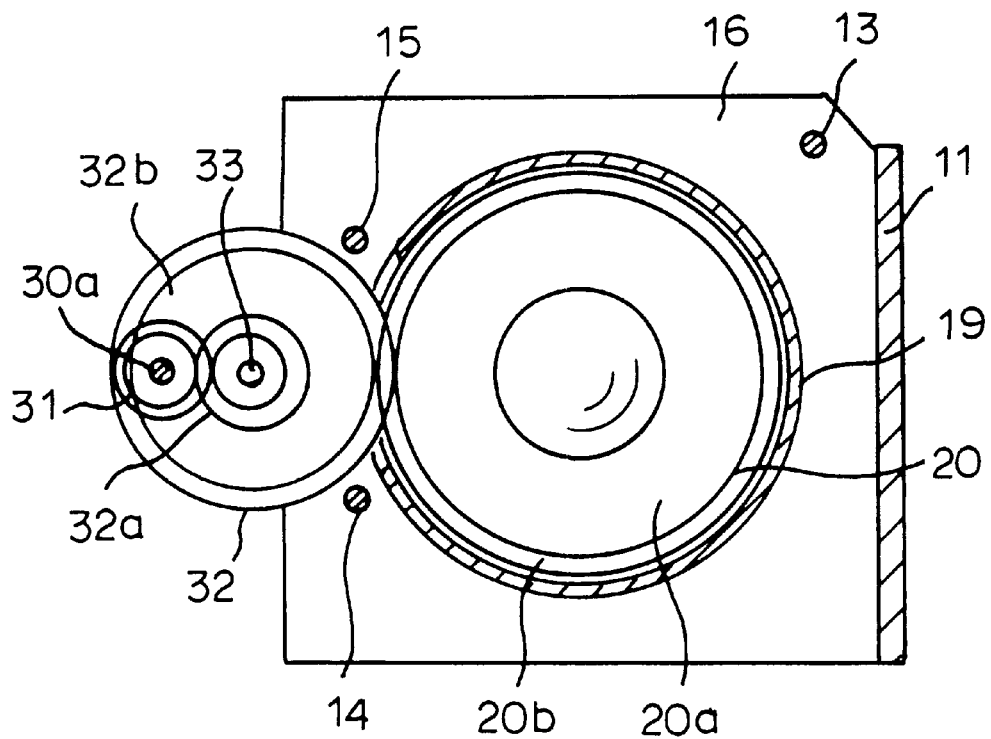
FIG. 5 is a cross sectional view taken along line B—B shown in FIG. 3.

The zoom lens optical system 2 consists of a first lens group 17, a second lens group 18 and a third lens group 20 which are arranged in this order from the front to the rear of the zoom lens optical system 2. The zoom lens optical system 2 is positioned in a substantially rectangular-shaped lens holder 11 for holding the zoom lens optical system 2 thereinside. The lens holder 11 is fixedly positioned in the camera body 1. The lengthwise direction of the lens holder 11 is in parallel to an optical axis O. The lens holder 11 is provided at its front with a circular opening 12a which is aligned with a circular opening 1a (see FIG. 1) formed at the front of the camera body 1. The lens holder 11 is provided at one side with a rectangular opening 11a (see FIGS. 2 or 6) which extends parallel to the optical axis O. In the lens holder 11 three parallel guide shafts 13, 14 and 15 are provided fixed, parallel to the optical axis O. The front and rear ends of each guide shaft 13, 14, 15 are fixed to a front wall 12 and a rear wall 16 of the lens holder 11, respectively. The CCD 10 is secured to the rear wall 16 to be positioned behind the third lens group 20 as shown in FIG. 3.

The first lens group 17 and the second lens group 18 are supported by a first lens frame 17a and a second lens frame 18a, respectively. The two radial projections 17b, 17c are integrally formed on the first lens frame 17a, and two radial projection 18b, 18c are integrally formed on the second lens frame 18a. The radial projections 17b and 17c are slidably engaged with the guide shafts 13 and 14, respectively. The radial projection 18b, 18c are slidably engaged with the guide shafts 13 and 15, respectively. Accordingly, the first lens group 17 is supported on the guide shafts 13 and 14 through the first lens frame 17a to be movable in a direction of the optical axis O (i.e., optical axis direction). The second lens group 18 is supported on the guide shafts 13 and 15 to be movable in the optical axis direction.

A helicoid barrel 19 is fixed to the rear wall 16 to be positioned inside the lens holder 11 with a central axis of the helicoid barrel 19 coincident with the optical axis O. The helicoid barrel 19 is provided on an inner periphery thereof with a female helicoid thread 19b (see FIG. 3). The third lens group 20 is supported by a third lens frame 20a which is fitted in the helicoid barrel 19 such that a male helicoid thread 20c (see FIG. 3) formed on an outer periphery of the third lens frame 20a is engaged with the female helicoid thread 19b of the helicoid barrel 19, so that the third lens group 20 moves in the optical axis direction when the third lens frame 20a rotates about the optical axis O relative to the helicoid barrel 19. The first and second lens groups 17 and 18 are moved relative to each other in the optical axis direction in a predetermined relationship to affect zooming. The third lens group 20 is moved in the optical axis direction to focus a subject image on a light receiving surface 10a of the CCD 10.

The radial projection 17c of the first lens frame 17a is provided thereon with a follower pin 17d. Likewise, the radial projection 18c of the second lens frame 18a is provided thereon with a follower pin 18d. The third lens frame 20a is provided, on an outer periphery at a rear end thereof, with a sector gear 20b (see FIGS. 3 or 6) which extends along a circumference of the third lens frame 20a. Namely, the sector gear 20b is formed on a rear part of the outer periphery of the third Lens frame 20a where the male helicoid thread 20c is not formed. The helicoid barrel 19 is provided on a cylindrical wall thereof with a slot 19a through which the sector gear 20b is engaged with a large gear portion 32b of a composite gear (reduction gear) 32. Accordingly, the sector gear 20b is formed on a rear part of the outer periphery of the third lens frame 20a to have a sufficient width in the optical axis direction to be continuously engaged with the large gear portion 32b of the composite gear 32 even when the third lens frame 20a moves in the optical axis direction relative to the lens holder 11. The radius of the addendum circle of the sector gear 20b is smaller than that of the male helicoid thread 20c so that the sector gear 20b does not contact the female helicoid thread 19b of the helicoid barrel 19.

The camera 100 is provided in the camera body 1 with a lens driving mechanism 21 fixed to one side of the lens holder 11. The lens drive mechanism 21 is provided with a cam cylinder 22 and a first motor (zooming motor) 23. The cam cylinder 22 is positioned aside of the lens holder 11 such that a rotational axis of the cam cylinder 22 extends parallel to the optical axis O. Namely, the cam cylinder 22 is not positioned either coaxial to or around the zoom lens optical system 2. In other words, the zoom lens optical system 2 is positioned outside the cam cylinder 22. The cam cylinder 22 is rotated by the first motor 23. The cam cylinder 22 is formed to have a diameter smaller than the height of the lens holder 11. A rectangular frame 24 is fixed to one side of the lens holder 11 by set screws 27 (see FIG. 2). The frame 24 is provided at its rear end with a rear bearing plate 26 which extends in a direction perpendicular to the optical axis O. A front bearing plate 25 is secured to the front end of the frame 24 by the corresponding set screws 27 to extend in parallel to the rear bearing plate 26. The front and rear bearing plate 25 and 26 are provided at opposing surfaces thereof with front and rear bearing bosses 25a and 26a, respectively. The front and rear ends of the cam cylinder 22 are respectively fitted on the front and rear bearing bosses 25a and 26a so that the cam cylinder 22 can rotate about the rotational axis thereof. The front bearing plate 25 is provided with a circular opening 25b having its center coincident with the rotational axis of the cam cylinder 22. The first motor 23, having a rotating shaft 23a, is secured to the front bearing plate 25 with an outer periphery of the first motor 23 being fitted in the circular opening 25b and with the rotating shaft 23a coaxial to the rotational axis of the cam cylinder 22.

The cam cylinder 22 is provided, at an approximate center in an axial direction thereof, with a circular plate 22a which is secured to an inner periphery of the cam cylinder 22 to extend normal to the axial direction of the cam cylinder 22. A key hole 22b is formed at the center of the circular plate 22a. The key hole 22b has the shape of a combination of a circular hole and two recesses positioned oppositely along a circumference of the circular hole. The rotating shaft 23a of the first motor 23 is connected with a rotational speed reducing mechanism 28 having a reduction gear train (not shown) therein. The rotational speed reducing mechanism 28 is provided with an output rotating shaft 28a which extends coaxial to the rotating shaft 23a. Due to the reduction gear train provided in the rotational speed reducing mechanism 28, the output rotating shaft 28a rotates by a lower rotational speed than that of the rotating shaft 23a of the first motor 23 when the rotating shaft 23a rotates. A key member 29 which is formed to have a shape corresponding to that of the key hole 22b is secured to the output rotating shaft 28a. The key member 29 is fitted in the key hole 22b to be fixed thereto so that the rotating shaft 23a of the first motor 23 is positioned coaxial to the rotational axis of the cam cylinder 22.

The cam cylinder 22 is provided with two cam slots, i.e., first and second cam slots 22c and 22d each having a predetermined cam contour. The follower pins 17d and 18d of the first and second lens frames 17a and 17b are fitted in the first and second cam slots 22c and 22d, respectively. Accordingly, when the cam cylinder 22 is driven to rotate by the first motor 23, the follower pins 17d and 18d are respectively moved along the first and second cam slots 22c and 22d due to the function of a combination of the follower pin 17d and the first cam slot 22c and the function of a combination of the follower pin 18d and the second cam slot 22d. Consequently, the first and second lens groups 17 and are each moved along the optical axis O according to the cam contours of the cam slots 22c and 22d, respectively. The cam contours of the cam slots 22c and 22d are predetermined such that a desired zooming ratio (focal length) can be obtained due to the relative movement of the first and second lens groups 17 and 18 in the optical axis direction.

The rear bearing plate 26 is provided with a circular opening 26b. A second motor (focusing motor) 30 having a rotating shaft 30a is secured to the rear bearing plate 26 with an outer periphery of the second motor 30 being fitted in the circular opening 26b. Also the rotating shaft 30a extends rearwardly in a direction away from the cam cylinder 22, i.e., upwardly as viewed in FIG. 3. Accordingly, the rotating shaft 30a of the second motor 30 is positioned behind the cam cylinder 22, whereas the rotating shaft 23a of the first motor 23 is positioned inside the cam cylinder 22. A pinion 31 which is engaged with a small gear portion 32a of the composite gear 32 is secured to the rotating shaft 30a. The composite gear 32 is fitted on a shaft 33 to be rotatable thereabout extending parallel to the optical axis O. The shaft 33 is supported by a stationary member (not shown) fixed to the lens holder 11. Because the large gear portion 32b of the composite gear 32 is engaged with the sector gear 20b of the third lens frame 20a through the slot 19a of the helicoid barrel 19 as mentioned before, the rotation of the composite gear 32 is transmitted to the third lens frame 20a. Accordingly, the rotation of the rotating shaft 30a of the second motor 30 causes the third lens frame 20a to rotate via the pinion 30a, the composite gear 32 and the sector gear 20b. Consequently the third lens frame 20a moves in the optical axis direction with respect to the helicoid barrel 19 due to the function of the male and female helicoid threads 19b and 20c engaged with each other.

The first motor 23 is actuated, rotating its rotational shaft 23a in a forward or reverse direction when the zoom operational knob 6 is manually operated to tilt in a corresponding direction. When the first motor 23 is actuated, rotating its rotational shaft 23a, the rotation of the rotational shaft 23a is transmitted to the cam cylinder 22 via the rotational speed reducing mechanism 28, the key member 29 and the circular plate 22a, so that the cam cylinder 22 rotates about its rotational axis. This rotation of the cam cylinder 22 causes the follower pins 17d and 18d to move in the optical axis direction due to the cam contours of the first and second cam slots 22c and 22d, so that the first and second lens groups 17 and 18 are moved in the optical axis direction in a predetermined relationship to thereby make the variation of the focal length of the zoom lens optical system 2 possible.

When the second motor 30 is actuated to rotate its rotational shaft 30a, the third lens frame 20a rotates about the optical axis O relative to the helicoid barrel 19 through the pinion 31, the composite gear 32 and the sector gear 20b while moving in the optical axis direction due to the function of the male and female helicoid threads 19b and 20c engaged with each other, so that the third lens group 20 is moved in the optical axis direction relative to the CCD 10 to make it possible to adjust the position of the third lens group 20 relative to the CCD 10 in the optical axis direction, i.e., make it possible to bring a subject image into focus on the light receiving surface 10a of the CCD 10.

As can be seen from the foregoing, in the embodiment of the digital still camera 100 to which the present invention is applied, because the cam cylinder 22, provided as an element of the lens drive mechanism 21, is positioned aside of the lens holder 11 such that the rotational axis of the cam cylinder 22 extends in parallel to the optical axis O while the cam cylinder 22 is formed to have a diameter smaller than the height of the lens holder 11, the height H of the camera body 1 has been successfully reduced. Thus, the slim and compact design of camera 100 is possible due to the cam cylinder 22 not being arranged around the movable lens group or groups, unlike a conventional cam mechanism.

Furthermore, in the embodiment of the digital still camera 100, the lens driving mechanism 21 is compact because the cam cylinder 22 does not have to move linearly like a conventional cam plate but rather has only to rotate about the rotational axis of the cam cylinder 22. Moreover at least a part of the first motor 23 and at least a part of the second motor 30 are positioned inside the cam cylinder 22 at the front end and the rear end thereof, respectively.

Although the zoom lens optical system consists of three lens groups, i.e., the first, second and third lens groups 17, 18 and 20 in the above particular embodiment of the camera 100, the present invention is not limited solely to such a specific arrangement but may be applied to another camera having a zoom lens consisting of less than two or more than three lens groups.

Although the camera 100 is provided with an autofocusing mechanism which includes the second motor 30, the pinion 31, the composite gear 32, the sector gear 20b, etc. in the above particular embodiment, the present invention may also be applied to a camera having a manual focusing mechanism or a pan-focus type of camera. If there is no autofocusing mechanism, it is not necessary for the camera to be provided with a motor which corresponds to the second motor 30.

Although the cam cylinder 22 is positioned such that the rotational axis extends in parallel to the optical axis O in the above particular embodiment, the cam cylinder 22 can be positioned such that the rotational axis extends substantially perpendicular to the optical axis O. In this case, each of the first and second lens frames 17a and 18a may be linked with the corresponding cam slot 22c or 22d through an appropriate linking lever or the like.

Although the above embodiment of the camera 100 is a digital still camera, the present invention may also be applied to another type of camera such as a conventional still camera using a light sensitive film (e.g., 35 mm film), a video camera, etc.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera comprising:
    a lens including a plurality of lens groups, at least one of said plurality of lens groups being moved in a direction of an optical axis to vary a focal length of said lens; and
    a cam cylinder, driven to rotate about a rotational axis of said cam cylinder, for moving said at least one of said plurality of lens groups,
    wherein said plurality of lens groups and said cam cylinder are not coaxially arranged, and
    wherein said plurality of lens groups are positioned outside said cam cylinder.

2. The camera according to claim 1, further comprising a lens holder for holding said plurality of lens groups inside said lens holder.

3. The camera according to claim 2, wherein said cam cylinder is formed to have a diameter smaller than the height of said lens holder.

4. The camera according to claim 1, further comprising a first motor for rotating said cam cylinder about said rotational axis,
    wherein at least a part of said first motor is positioned inside said cam cylinder.

5. The camera according to claim 4, further comprising a second motor for moving at least another one of said plurality of lens groups in said direction of said optical axis to bring a subject into focus,
    wherein said at least a part of said first motor is positioned inside said cam cylinder at one end of said cam cylinder, and
    wherein at least a part of said second motor is positioned inside said cam cylinder at the other end of said cam cylinder.

6. The camera according to claim 5, wherein a rotating shaft of said second motor extends in a direction away from said cam cylinder to be positioned outside said cam cylinder.

7. The camera according to claim 5, further comprising:
    a lens holder for holding said plurality of lens groups inside said lens holder;
    a barrel fixed to said lens holder and comprising a female thread formed on an inner periphery of said barrel; and
    a lens frame for supporting said at least another one of said plurality of lens groups, said lens frame comprising a male thread formed on an outer periphery of said lens frame to be engaged with said female thread of said barrel so that said lens frame moves in said direction of said optical axis when driven to be rotated about said optical axis relative to said barrel.

8. The camera according to claim 1, wherein said rotational axis of said cam cylinder extends substantially parallel to said optical axis.

9. The camera according to claim 1, wherein each of said at least one of said plurality of lens groups is supported by a lens frame having a cam follower, and wherein said cam cylinder comprises a corresponding cam slot in which said cam follower is fitted.

10. The camera according to claim 2, further comprising:
    a motor for rotating said cam cylinder about said rotational axis; and
    first and second bearing members, fixed to said lens holder, for supporting one end and the other end of said cam cylinder, respectively,
    wherein said motor is secured to one of said first and second bearing members such that at least a part of said motor is positioned inside said cam cylinder and that a rotational shaft of said motor is coaxial to said rotational axis of said cam cylinder.

11. The camera according to claim 10, further comprising:
    a member having a key hose which is fixed to an inner periphery of said cam cylinder; and
    a key member engaged with said key hole and is rotated by a rotational shaft of said motor.

12. The camera according to claim 11, further comprising a rotational speed reducing mechanism provided between said rotational shaft of said motor and said key member.

13. The camera according to claim 1, further comprising an image pick-up device secured to said lens holder so that a subject image is focused through said plurality of lens groups to be formed on said image pick-up device.

14. The camera according to claim 2, wherein said lens holder comprises a plurality of guide shafts extending parallel to said optical axis For guiding said at least one of said plurality of lens groups in said direction of said optical axis.

15. A zoom lens unit comprising:
    a zoom lens optical system comprising a plurality of lens groups, at least one of said plurality of lens groups being moved in an optical axis direction to vary the focal length of said zoom lens optical system;
    a lens holder for holding said zoom lens optical system while allowing said at least one of said plurality of lens groups to move in said optical axis direction; and
    a cam cylinder, driven to rotate about a rotational axis of said cam cylinder, for moving said at least one of said plurality of lens groups, said cam cylinder being supported by said lens holder to be positioned outside said lens holder.

16. A zoom lens mechanism comprising:
    a plurality of lens groups, at least one of said plurality of lens groups being guided in an optical axis direction; and a cam cylinder, driven to rotate about a rotational axis of said cam cylinder, for moving said at least one of said plurality of lens groups in said optical axis direction to effect zooming, wherein said plurality of lens groups are positioned outside said cam cylinder.

* * * * *